United States Patent [19]

Su et al.

[11] Patent Number: 5,409,365
[45] Date of Patent: Apr. 25, 1995

[54] NOODLE MACHINE

[75] Inventors: Yuan-An Su, Tainan Hsien; Wei-Chung Yang, Taipei, both of Taiwan, Prov. of China

[73] Assignees: Pisaw Co. Ltd., Taipei; Dong Yi Electric Co. Ltd., Tainan Hsien, both of Taiwan, Prov. of China

[21] Appl. No.: 321,805

[22] Filed: Oct. 12, 1994

[51] Int. Cl.[6] .................... A21C 3/04; B29F 3/01
[52] U.S. Cl. ........................ 425/204; 99/353; 366/81; 366/195; 366/295; 366/319; 425/72.1; 425/190; 425/205; 425/376.1
[58] Field of Search ............... 99/353, 348, 450.1, 99/485; 366/77–79, 81, 96–99, 186, 295, 194–196, 318, 319; 425/72.1, 190, 191, 204, 205, 376.1; 426/516, 557

[56] References Cited

U.S. PATENT DOCUMENTS

| | | | |
|---|---|---|---|
| 4,097,213 | 6/1978 | McComb et al. | 426/516 |
| 4,269,582 | 5/1981 | Mella | 425/190 |
| 4,360,332 | 11/1982 | Cyin | 425/191 |
| 4,367,064 | 1/1983 | Prandelli et al. | 425/204 |
| 4,383,813 | 5/1983 | Podell et al. | 425/204 |
| 4,406,603 | 9/1983 | Williams | 425/376.1 |
| 4,465,447 | 8/1984 | Cheigh et al. | 425/72.1 |
| 5,324,185 | 6/1984 | Backus | 425/72.1 |
| 5,333,538 | 8/1994 | Sawa | 99/353 |

*Primary Examiner*—Timothy F. Simone
*Attorney, Agent, or Firm*—Morton J. Rosenberg; David I. Klein

[57] ABSTRACT

A noodle machine has a housing with an upper opening, a receptacle deposited in the housing for receiving flour and water for making dough for noodles by stirring them by rotation of a stirring shaft positioned horizontally in the receptacle and rotated by a motor. A front cap with a center cylindrical portion for a screw portion of the stirring shaft fits therein to squeeze out dough to go out through a sieve with holes fixed at the front of the cylindrical portion to become noodles. And a shutter hangs at a notch at an upper side edge of the receptacle for closing an opening of a U-shaped plate of the front cap for hampering dough from moving into the screw portion and removed to let dough move through the opening of the U-shaped plate to be squeezed out of the sieve to become noodles by rotation of the screw portion.

1 Claim, 7 Drawing Sheets

(PRIOT ART)

NOODLE MACHINE

BACKGROUND OF THE INVENTION

This invention concerns a noodle machine, particularly a small one used in homes having a shutter for preparing dough being mixed and stirred in a receptacle and removed temporarily for making noodles from the dough mass prepared in the receptacle.

There is a known conventional small noodle machine for home use shown in FIG. 7, which has a housing 10, a receptacle 20 fixed in the housing 10 and having a large hole 201 in a front side, a front cap 30 provided to fit around the large hole 201 and having a cylindrical portion 301 extending forward and an inverted U-shaped plate extending rearward, and a horizontal stirring means 40 having a front screw portion 401 fitting in the cylindrical portion 301, a rear stirring shaft portion 402 with several sidewise stirring bars extending from the shaft portion 402 and a shallow annular groove 403 between the screw portion 401 and the stirring shaft portion 402. The rear side of the receptacle 20 has a square hole 102 for the rear end of the stirring means 40 to fit a little through. A fitting vertical groove 202 is provided in an inner vertical side wall of the receptacle 20 in line with the shallow annular groove 403 of the stirring means 40, so that a lower separating plate 501 is fitted in the fitting vertical groove 202 under the annular groove 403 and an upper separating plate 502 is fitted in the fitting vertical groove 202 on the annular groove. The rear end of the stirring means 40 is connected with a shaft of a motor 80 located on a rear inner side of the housing 10 so that the stirring means 40 may be rotated by the motor 80. And a locking cover 90 is provided to cover the front end of the front cap 30, having a center hole and fixed firmly with the housing 10 by means of bolts 901, 901. The cylindrical portion 301 has at its front end an opening for a sieve 60 having several holes to fit firmly wherein and exposed out of the center hole of the locking cover 90 so that the dough mass prepared in the receptacle 20 may be transported squeezingly by rotation of the screw portion 401 of the stirring means 40 rotated by the motor 80 and pushed through out of the holes of the sieve to become noodles.

In making noodles, flour and water is put into a chamber formed in the receptacle 20 behind the upper and the lower separating plate 502 and 501, the rear side and two opposite sides the receptacle 29, and an upper lid 70 is closed on an upper opening of the receptacle 20. Then the motor 80 is started to rotate the stirring means 40, and the stirring shaft portion 402 mixes and stirs the flour and water into a dough mass until the dough becomes well mixed. Then the separating plate 502 has to be taken off the vertical grooves 202 of the receptacle 20 before the prepared dough mass in the receptacle 20 is moved to the screw portion 401 of the stirring means 40. After the separating plate 502 is removed, the dough mass can be transported squeezingly and gradually into the screw portion 401 by rotation of the stirring means 40 and pushed through the holes of the sieve 60 at the front end of the cylindrical portion 301 of the front cap 30 to come out as noodles.

A user must fit the separating plate 502 in the grooves 202 before preparing dough for noodles, and after a dough mass is well prepared by putting in flour and water in the receptacle 20 and mixed and stirred enough, it has to be remembered to take off the separating plate 502 for permitting the dough mass into the screw portion 401. Otherwise, the dough mass cannot move therein, stopped by the separating plate 502. However, the lower separating plate 501 is not to be taken out, being kept in its position by the lower end and one vertical side fitting in the vertical groove 202 of the receptacle 20, so very liable to shake to and fro in mixing and stirring dough, and even in a worse occasion it may be carried away with the dough mass moved by the stirring shaft portion 402, losing function of hampering dough mass. Structure of the receptacle 20 with the vertical groove 202 on an inner vertical wall and separating plates 501, 502 to be fitted therein makes it quite inconvenient in using this conventional noodle machine.

SUMMARY OF THE INVENTION

This invention has been devised to improve the known conventional noodle machine mentioned above.

A noodle machine in the present invention is provided with a removable shutter to hang on an upper side edge of a front side of a receptacle to prevent dough mass prepared in a dough making area, i.e. in the receptacle, from moving into a screw portion of a stirring shaft, and in case of removing the shutter the prepared dough mass can move therein so as to be transported squeezingly by rotating of the screw portion to be pushed out of a plurality of holes of a sieve fixed at a front end of a cylindrical portion of a front cap, becoming noodles.

BRIEF DESCRIPTION OF DRAWINGS

The invention will be better undedrstood by reference to the accompanying drawings, wherein.

DESCRIPTION OF PREFERRED EMBODIMENTS

Figure 1:
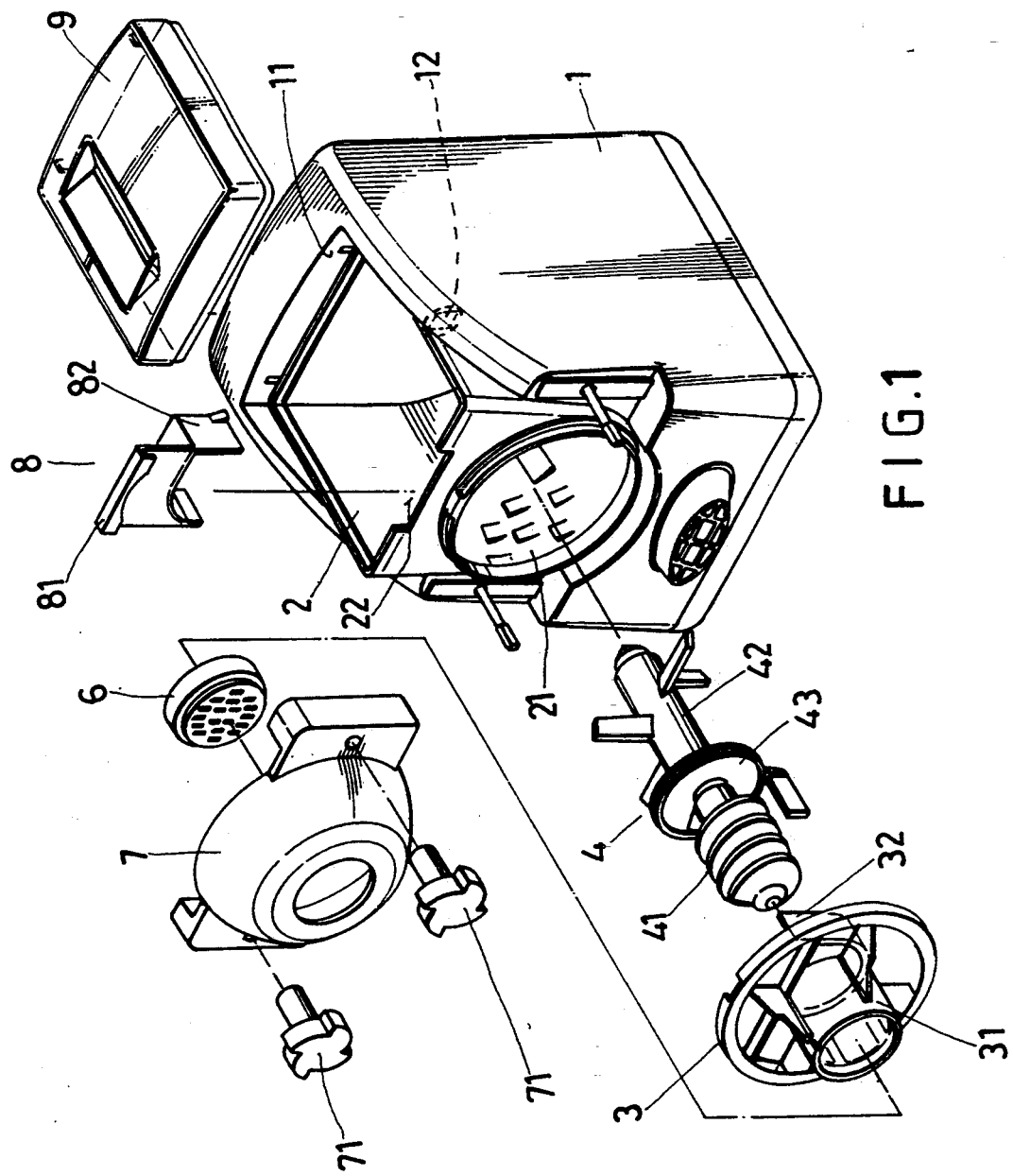
FIG. 1 is an exploded perspective view of a noodle machine in the present invention.
Figure 2:
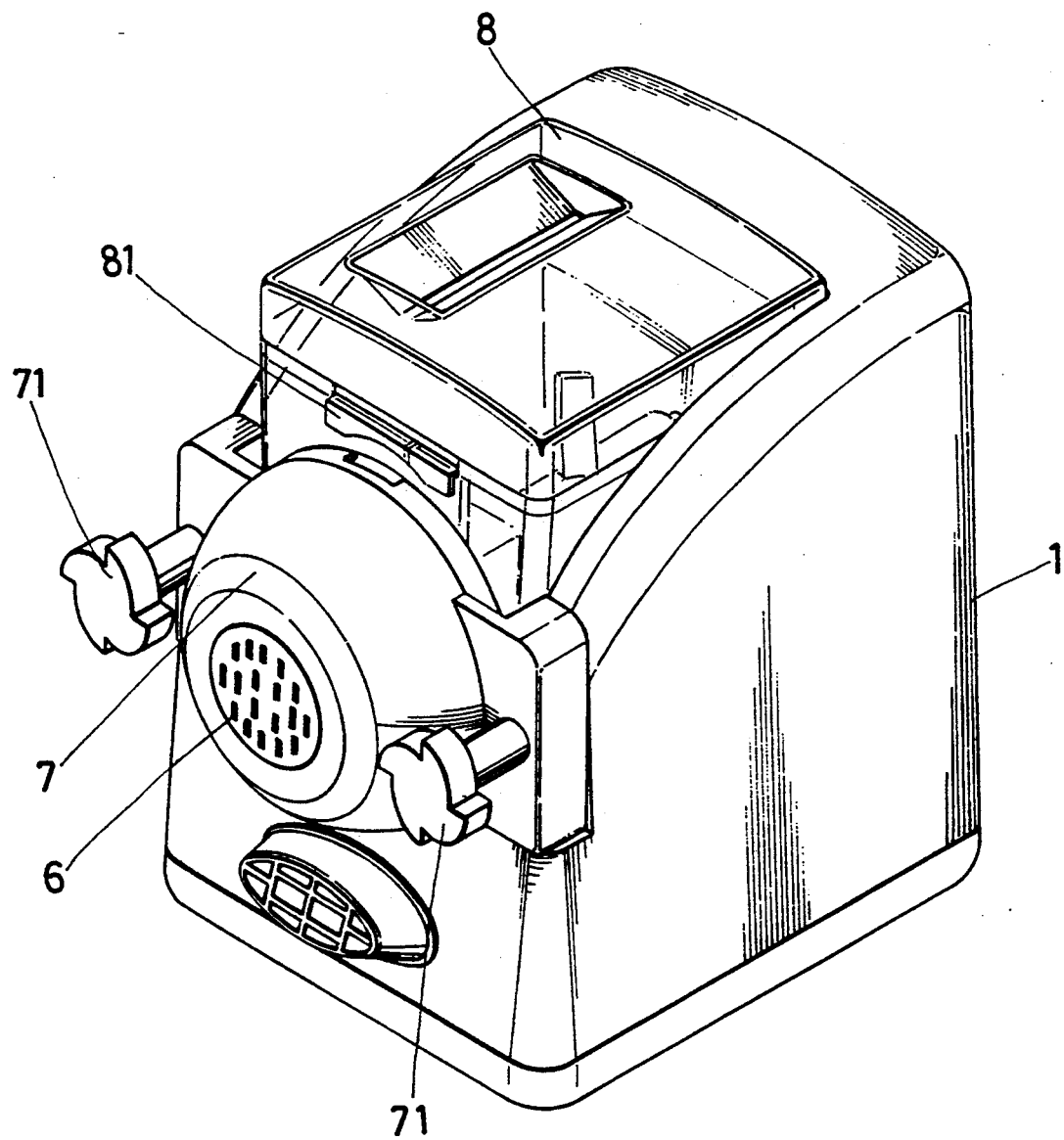
FIG. 2 is a perspective view of the noodle machine in the present invention.
Figure 3:
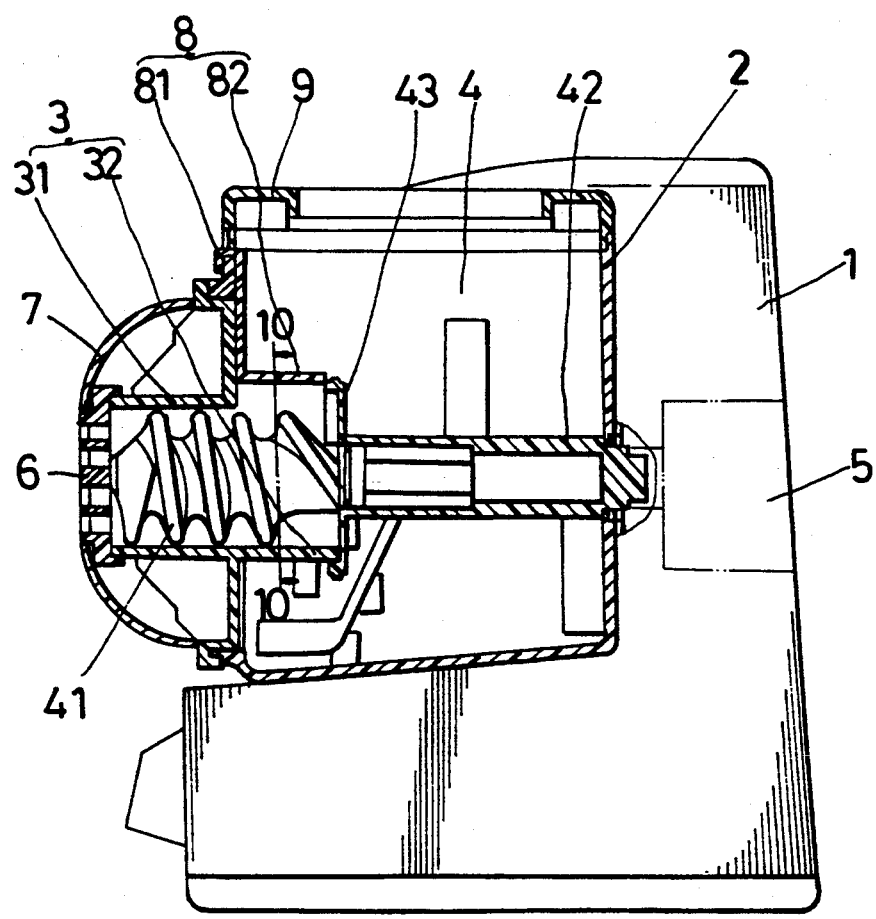
FIG. 3 is a side cross-sectional view of the noodle machine in the present invention.
Figure 4:
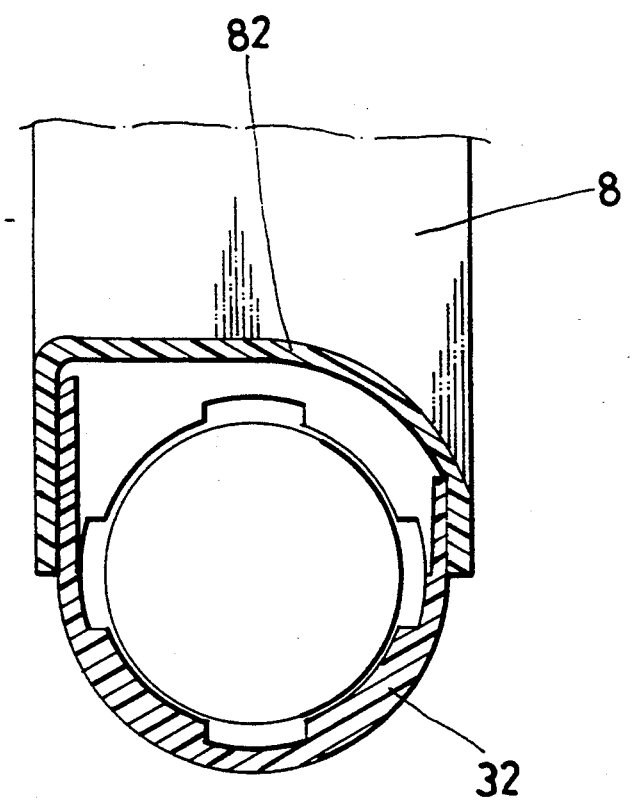
FIG. 4 is a cross-sectional view of line 10—10 in FIG. 2.

A noodle machine in the present invention, as shown in FIGS. 1 and 2, includes a housing 1 having an opening 11 in an upper side, a receptacle 2 deposited through the opening 11 in an interior of the housing 1, a large hole 21 surrounded by a low circumferential wall provided in a front side of the receptacle 2 for combining with a front cap 3. The cap 3 has a center projecting-forward cylindrical poriton 31, a U-shaped plate 32 provided at the rear side for a stirring shaft 4 to fit between its two parallel sides. The stirring shaft 4 has a front screw portion 41 and a rear stirring portion 42, and the stirring portion 42 has a plurality of stirring bars extending radially. The receptacle 2 has a hole 12 in a rear side for the rear end of the stirring portion 42 to fit through. A motor 5 is provided on a rear side of the housing 1 just behing the hole 12, having its shaft connected with the rear portion 42 so that the stirring shaft 4 may be rotated. A sieve 6 is provided to be fixed in a front opening of the cylindrical portion 31 of the cap 3, having a plurality of holes for forming noodles when dough mass is squeezed therethrough. Then a locking cover 7 having a center hole is provided at the front of the front cap 3 and fixed firmly with the housing 1 by means of bolts 71, 71.

The structure of the noodle machine just described above is the same as a conventional one, not intended to be included in this invention. The improvement included in this invention is to be described below.

The stirring shaft 4 has a front screw portion 41, a rear stirring portion 42 and a disc portion 43 between the screw portion 41 and the stirring portion 42 for hampering finished dough mass from moving forward when noodle is going to be made of the dough mass. A notch 22 is provided in the upper side edge of the receptacle 2, and a shutter 8 to provided to have a U-shaped hook 81 to hang on the notch 22, being located in the receptacle 2. The shutter 8 also has a lower vertical curved plate 82 contacting firmly just under the U-shaped plate 32 of the front cap 3, hampering dough being made in the receptacle 2 from moving into the front screw portion 41 of the stirring shaft 4.

Figure 5:
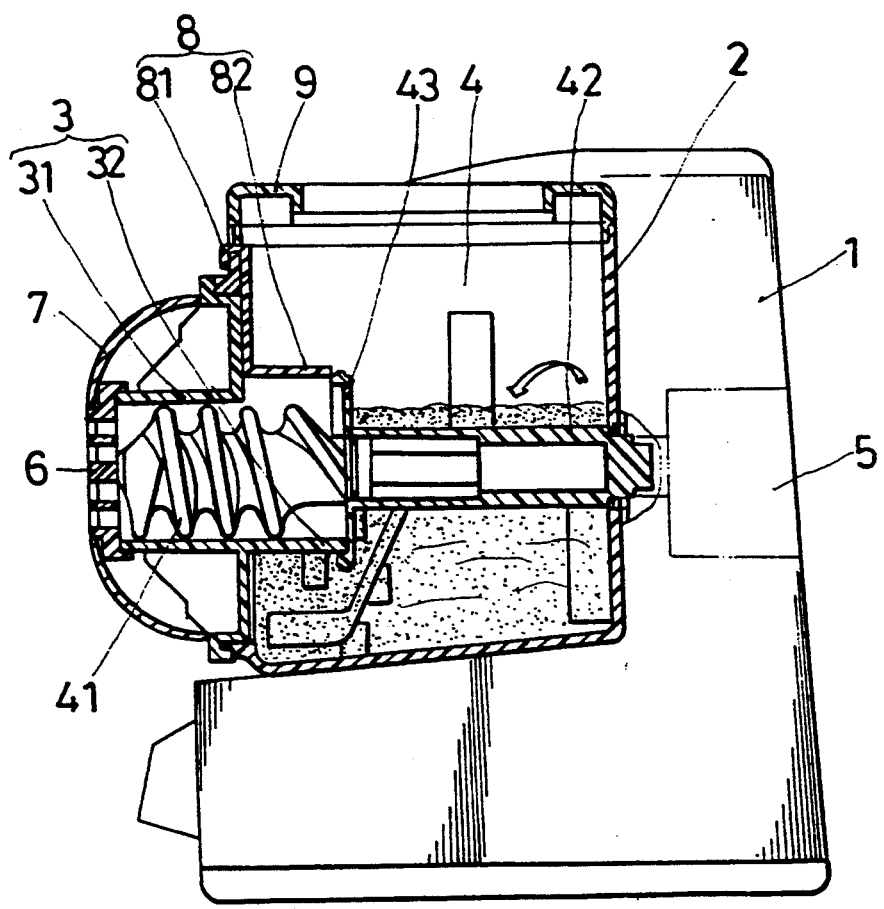
FIG. 5 is a side cross-sectional view of the noodle machine in the present invention, showing it in a condition of making dough by stirring.
Figure 6:
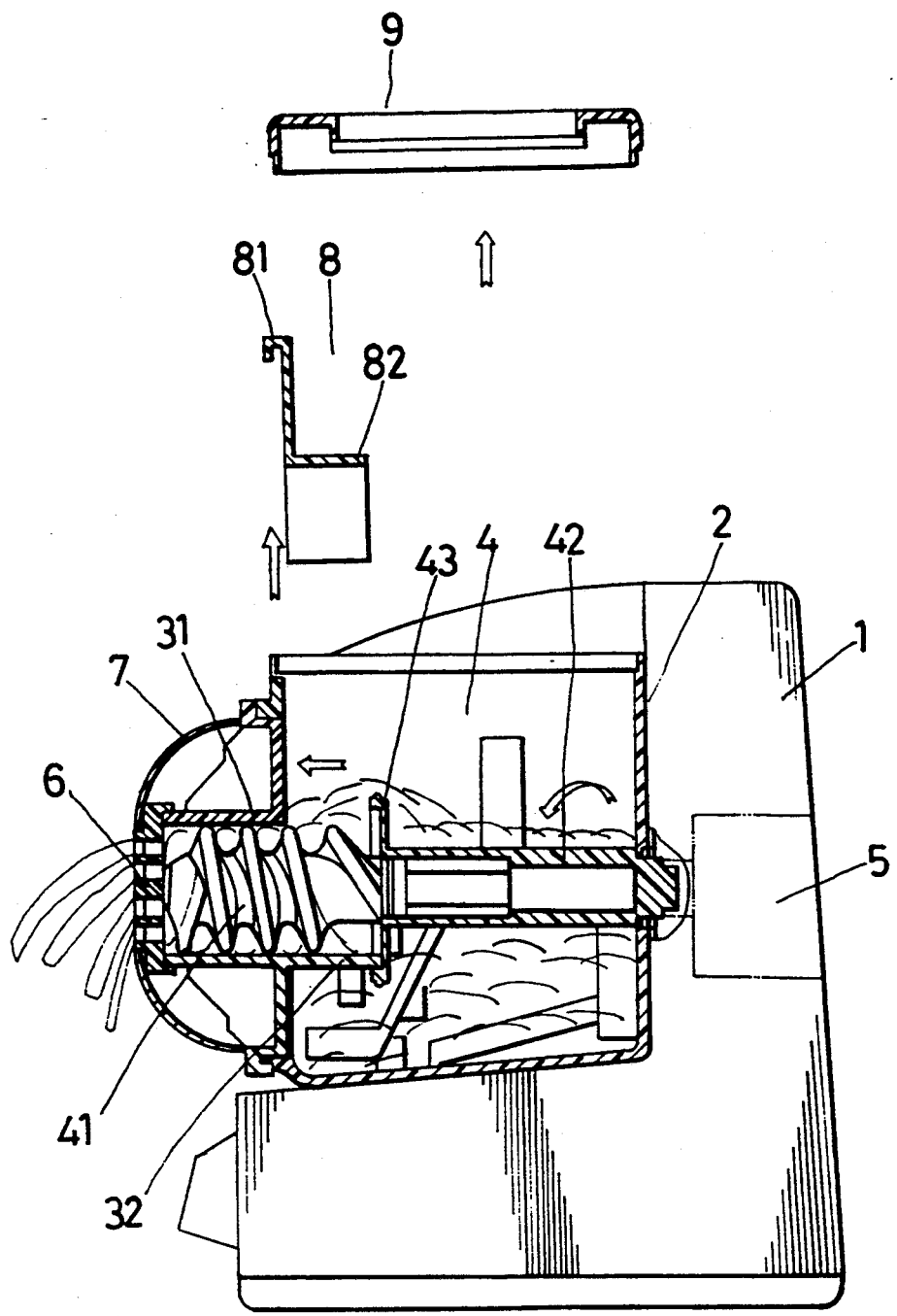
FIG. 6 is a side cross-sectional view of the noodle machine in the present invnetion, showing it in a condition of making noodle by squeezing dough mass out of a sieve by rotation of a screw portion of of a stirring shaft.
Figure 7:
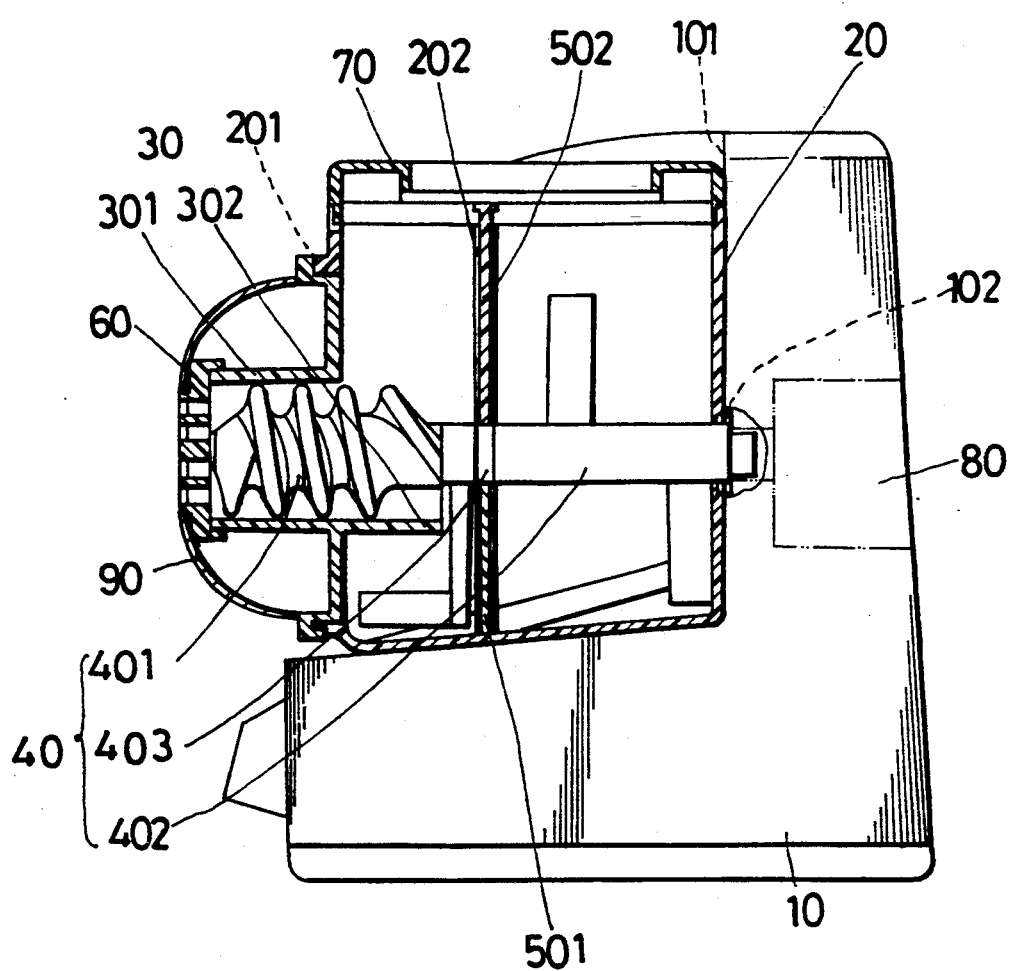
FIG. 7 is a side cross-sectional view of a known conventional noodle machine.

In making noodles with the present invention, as shown in FIG. 5, a proper sieve 6 should be selected, having the size of noodle holes to conform to the size of noodle being made and fitted firmly in the front opening of the cylindrical portion 31 of the front cap 3. A lid 9 is provided to close up the upper opening of the receptacle 2, after flour and water are put into the receptacle 2, and then the motor 5 is started to mix and stir them together evenly, making the dough mass well-stirred. Before pushing the dough mass by the screw portion 41 of the stirring shaft 4 rotated by the motor 5 for making noodles, as shown in FIG. 6, the shutter 8 has to be taken off the receptacle 2, permitting the dough mass therein to move and drop down through an opening closed by the shutter 6 between the two side walls of the U-shaped plate 32 of the front cap 3 and then transported squeezingly forward by the screw portion 41 of the stirring shaft 4 to go through the holes of the sieve 6 to become noodles.

Provision of the shutter 8 removable and the disc portion 43 of the stirring shaft 4 separates a dough stirring area and a noodle squeezing area for convenience of preparing dough and making noodles independently. The disc portion 43 serves for hampering dough a little so as to let it move in proper quantity into the screw portion 41.

While the preferred embodiments of the invention have been described above, it will be recognized and understood that various modifications may be made therein and the appended claims are intended to cover all such modifications which may fall within the spirit and scope of the invention.

What is claimed is:

1. A noodle machine comprising a housing with an open upper side, a receptacle deposited in an interior of said housing and having a large hole surrounded by a low wall in a front side for combining with a front cap, a stirring shaft provided between said front cap and said receptacle and extending horizontal in said receptacle and connected with and rotated by a shaft of a motor, said front cap having a center cylindrical portion for a front section of a front screw portion of said stirring shaft to fit therein, a sieve provided to fit firmly in the front opening of said cylindrical portion and having a plurality of holes for dough mass to pass through out to become noodles, a locking cover provided to be placed in front of said front cap and locking said front cap with said housing, and characterized by said stirring shaft having said front screw portion, a rear stirring portion and a disc portion between said screw portion and said stirring portion, by said receptacle having a notch in an upper side edge of a front side for a shutter to hang on, by said shutter having an inverted U-shaped hook to hang on said notch of said receptacle to be positioned in said receptacle and a curved-up closing plate contacting a lower surface of the U-shaped plate of said front cap so as to close up an opening of said U-shaped plate to hamper said dough mass from moving through said opening into said screw portion of said stirring shaft and by said shutter being removed from said receptacle so that said dough mass in said receptacle may be transported squeezingly through said opening into said screw portion of said stirring shaft and pushed by rotation of said screw portion through said sieve to become noodles.

* * * * *